(12) United States Patent
Katoh et al.

(10) Patent No.: US 6,419,552 B2
(45) Date of Patent: Jul. 16, 2002

(54) THIN-FILM MAGNETIC HEAD MANUFACTURING METHOD AND APPARATUS

(76) Inventors: Masato Katoh; Shigenobu Miyajima, both of 1-7 Yukigaya, Otsuka-cho, Ota-ku, Tokyo (JP)

(*) Notice: Subject to any disclaimer, the term of this patent is extended or adjusted under 35 U.S.C. 154(b) by 0 days.

(21) Appl. No.: 09/863,731

(22) Filed: May 23, 2001

Related U.S. Application Data

(62) Division of application No. 09/488,694, filed on Jan. 20, 2000, now Pat. No. 6,299,507.

(30) Foreign Application Priority Data

Jan. 28, 1999 (JP) ............................................. 11-020456

(51) Int. Cl.$^7$ ................................................ G11B 5/00
(52) U.S. Cl. ................ 451/9; 451/10; 451/11; 451/41; 29/603.08; 29/603.12; 216/88; 360/321; 360/121
(58) Field of Search ............................. 451/5, 8, 9, 10, 451/11, 41; 29/603.08, 603.12, 603.16, 407, 423, 559; 216/88, 89; 360/321, 322, 121, 122; 438/692, 693

(56) References Cited

U.S. PATENT DOCUMENTS

| | | |
|---|---|---|
| 5,095,613 A | 3/1992 | Hussinger et al. |
| 5,321,882 A | 6/1994 | Zarouri et al. |
| 5,406,694 A | 4/1995 | Ruiz |
| RE35,477 E | 3/1997 | Hussinger et al. |
| 5,632,669 A * | 5/1997 | Azarian et al. ................ 451/54 |
| 5,722,156 A | 3/1998 | Balfrey et al. |
| 5,736,060 A * | 4/1998 | George et al. ................. 216/22 |
| 5,745,978 A * | 5/1998 | Aboaf et al. ............. 29/603.08 |
| 5,885,131 A * | 3/1999 | Azarian et al. ................ 451/5 |
| 5,893,981 A * | 4/1999 | Dovek et al. ................. 216/22 |

FOREIGN PATENT DOCUMENTS

| | | |
|---|---|---|
| JP | 1-153242 | 6/1989 |

* cited by examiner

*Primary Examiner*—Eileen P. Morgan
(74) *Attorney, Agent, or Firm*—Brinks Hofer Gilson & Lione

(57) ABSTRACT

In a thin-film magnetic head manufacturing method and apparatus, lapping is continued until the MR height of a magnetoresistive sensor falls into a finish tolerance range and the lapping time from the beginning of lapping exceeds a predetermined time, thereby substantially reducing the recession between an ABS of a slider bar and a surface of a thin-film magnetic element opposing a recording medium.

26 Claims, 8 Drawing Sheets

THIN-FILM MAGNETIC HEAD MANUFACTURING METHOD AND APPARATUS

This application is a divisional application of U.S. application Ser. No. 09/488,694 filed on Jan. 20, 2000, entitled "Thin-Film Magnetic Head Manufacturing Method and Apparatus", now U.S. Pat. No. 6,299,507.

BACKGROUND OF THE INVENTION

1. Field of the Invention

The present invention relates to a thin-film magnetic head manufacturing method and apparatus for precisely lapping thin-film magnetic heads for use in magnetic disk devices and the like.

2. Description of the Related Art

In manufacturing thin-film magnetic heads, in general, thin layers constituting thin-film magnetic elements, such as insulating layers, magnetic layers, and conductive layers, are stacked in order on a substrate made of $Al_2O_3$—TiC (alumina titanium carbide) by sputtering, and the thin layers are worked by photolithography or ion milling as required.

In order to manufacture thin-film magnetic heads, plural thin-film magnetic elements 1 are formed in plural rows on a substrate 2, as shown in FIG. 5 (FIG. 5 shows only some of the thin-film magnetic elements 1). A thin-film magnetic element 1 is a so-called "MR (magnetoresistive)/inductive combined magnetic head" in which an MR magnetic head having a magnetoresistive sensor for reading recorded information and an inductive magnetic head for writing are combined. The thin-film magnetic elements 1 are electrically connected by electrodes 4 connected thereto. The substrate 2 is cut along the dotted lines to yield a slider bar as shown in FIG. 6.

In manufacturing a thin-film magnetic head, the height of the magnetoresistive sensor of the MR magnetic head in the thin-film magnetic element 1 must be adjusted to a predetermined value. The MR height is adjusted by lapping an ABS (air-bearing surface) 3a shown in FIG. 6 while using some of a plurality of magnetoresistive sensors as monitor elements, and measuring DC resistance values (DCR values) between the electrode layers connected to both ends of the magnetoresistive sensors.

By lapping the ABS 3a until the DCR value fall into the finish tolerances, the height of the magnetoresistive sensors (MR height) can be set at an appropriate value. After the MR height is adjusted, the slider bar 3 is cut along the dotted lines shown in FIG. 6 into individual thin-film magnetic heads. Individual substrates cut from the slider bar 3 serve as sliders. The ABS 3a of the slider faces a recording medium and receives a levitating force when the recording medium moves.

Lapping for adjusting the MR height is performed by using, for example, a lapping plate 21 shown in FIG. 8. The slider bar 3 shown in FIG. 6 is placed so that the ABS 3a thereof is in contact with the surface of the lapping plate 21. The lapping plate 21 is rotationally driven to lap the ABS 3a of the slider bar 3.

FIGS. 9A and 9B are flowcharts showing the process of lapping for adjusting the MR height.

Lapping is performed in two stages, rough lapping (FIG. 9A) with a lapping fluid applied on the upper surface of the lapping plate 21, and finish lapping (FIG. 9B) with a lubricant applied on the lapping plate 21 as necessary.

In rough lapping, as shown in FIG. 9A, lapping is continued while the DCR values of the monitor elements are being monitored, and is completed when the DCR values fall into a predetermined DCR range.

In finish lapping shown in FIG. 9B, lapping is similarly performed while the DCR values of the monitor elements are being monitored, and it is completed when the DCR values fall into the finish tolerance range, which means that the MR heights also falls into the finish tolerance range.

In a conventional lapping method, as shown in FIGS. 9A and 9B, however, a level difference is likely to remain between the ABS 3a of the slider bar 3 and the thin-film magnetic element 1 in a completed thin-film magnetic head.

FIGS. 11A and 11B are side views of the slider bar 3 and the thin-film magnetic element 1, respectively, before lapping is started, and during or after lapping. When the thin-film magnetic element 1 is formed (the process shown in FIG. 5), a cover layer 5 is formed to cover the thin-film magnetic element 1. This cover layer 5 is made of $Al_2O_3$ or $SiO_2$.

In rough lapping, as described with reference to FIG. 9A, the lapping fluid contains fine particles, and the ABS 3a is lapped therewith.

The thin-film magnetic element 1 primarily made of $Al_2O_3$, NiFe (permalloy), or the like is lapped at a higher rate than the slider bar 3 made of $Al_2O_3$—TiC (alumina titanium carbide) or the like. Therefore, as shown in FIG. 11B, a level difference is likely to be formed between the ABS 3a of the slider bar 3 and a surface 1a of the thin-film magnetic element 1 opposing the recording medium in rough lapping.

In particular, in rough lapping with the lapping fluid applied on the surface of the lapping plate 21, the opposing surface 1a of the thin-film magnetic element 1 is likely to be lapped at a high rate by the fine particles in the lapping fluid, which increases the amount of level difference (recession). Hereinafter, the amount of level difference (recession) is represented by the letter "R". The recession R is zero when the opposing surface 1a of the thin-film magnetic element 1 is flush with the ABS 3a of the slider bar 3, and the direction in which the recession R increases is designated the "positive (+) direction".

Since rough lapping, as shown in FIG. 9A, is performed while monitoring only the DCR values of the magnetoresistive sensors, when the DCR values fall into a predetermined range, that is, when the heights of the magnetoresistive sensors (MR height) fall into a predetermined range, it is impossible to determine the extent to which the ABS 3a of the slider bar 3 has been lapped. For this reason, even when the opposing surface 1a of the thin-film magnetic element 1 has been sufficiently lapped and the MR height values are within the predetermined range, the ABS 3a of the slider bar 3 has not been sufficiently lapped and a substantial recession R is produced in the positive direction.

In the subsequent finish lapping process, the opposing surface 1a of the thin-film magnetic element 1 is lapped at a higher rate than the ABS 3a of the slider bar 3. Therefore, in a case in which a substantial recession R is produced during rough lapping, that is, when a great difference remains in the levels between the ABS 3a of the slider bar 3 and the opposing surface 1a of the thin-film magnetic element 1, if finish lapping is performed while monitoring only the DCR values, as shown in FIG. 9B, a substantial recession R remains when the DCR values of the thin-film magnetic element 1 falls into the finish height tolerances.

That is, although too large a recession R remains at the completion of rough lapping, and the ABS 3a of the slider bar 3 is not lapped to sufficiently reduce the recession R due to a short finish lapping time, finish lapping is completed.

Because of the need to cope with recent increases in density of recording media, thin-film magnetic heads have been required to minimize the distance between the opposing surface of the thin-film magnetic element and a recording medium in a driving state to reduce spacing loss as much as possible. If a substantial recession is produced in such a thin-film magnetic head as described above, the spacing loss increases, and this impairs writing/reading characteristics.

In general, the lapping plate 21 is rotated at approximately 100 rpm for the purpose of lapping. Conventionally, the lapping plate 21 is controlled by trapezoidal driving so that the power applied to a motor for driving the lapping plate 21 is switched from the driving state to a stop state at the completion of finish lapping. When the lapping plate 21 rotating at a high speed is rapidly stopped at the completion of finish lapping, flaws are produced on the ABS 3a of the slider bar 3 and the opposing surface 1a of the thin-film magnetic element 1.

The flaws on the ABS 3a of the slider bar 3 remain unchanged on an ABS of the slider, floating characteristics on the recording medium becomes unstable, or flaws may be produced on the surface of the recording medium.

SUMMARY OF THE INVENTION

In order to solve the above problems in the conventional art, an object of the present invention is to provide a thin-film magnetic head manufacturing method and apparatus in which lapping is performed so as to minimize the recession between an ABS of a slider bar and a surface of a thin-film magnetic element opposing a recording medium.

Another object of the present invention is to provide a thin-film magnetic head manufacturing method and apparatus in which flaws are prevented from being produced on an ABS of a slider bar at the completion of finish lapping.

According to one aspect of the present invention, there is provided a thin-film magnetic head manufacturing method for forming a thin-film magnetic element including a magnetoresistive sensor by stacking thin-film layers, such as an insulating layer, a magnetic layer, and a conductive layer, on a substrate, and for adjusting the MR height by lapping the substrate and the thin-film magnetic element in the height direction while measuring the resistance value of the magnetoresistive sensor, wherein lapping is continued until the lapping time exceeds a predetermined time and the resistance value or the MR height converted from the resistance value falls into the finish tolerances.

According to the present invention, lapping is not performed with reference only to the resistance value or the height value converted from the resistance value, which is different from that in the conventional art, and lapping is monitored until the lapping time exceeds a predetermined time. When the lapping time exceeds the predetermined time and the resistance value or the height converted from the resistance value falls into the finish tolerances, lapping is completed. By continuing the lapping for longer than the predetermined time while monitoring the resistance, as described above, it is possible to sufficiently lap the ABS of the substrate (slider bar) having a low lapping rate, to minimize the recession between the ABS and the surface of the thin-film magnetic element, and to make the recession zero.

According to another embodiment of the present invention, there is provided a thin-film magnetic head manufacturing method for forming a thin-film magnetic element including a magnetoresistive sensor by stacking thin-film layers, such as an insulating layer, a magnetic layer, and a conductive layer, on a substrate, and for adjusting the MR height by lapping the substrate and the thin-film magnetic element in the height direction while measuring the resistance value of the magnetoresistive sensor, wherein the rotation rate of a lapping plate in a lapping machine used for lapping is switched to a lower rate at least once to complete lapping when the resistance value or the MR height converted from the resistance value falls below a reference value.

When the lapping comes close to an end, that is, when the resistance value or the MR height converted from the resistance value falls below a reference value, the rotation rate of the lapping plate in the lapping machine is switched to a lower rate at least once, and the rotation of the lapping plate is stopped to complete lapping. This makes it possible to reduce flaws in the ABS of the slider and the surface of the thin-film magnetic element, to improve the floating characteristics of the thin-film magnetic head, and to prevent a magnetic head from producing flaws on a recording medium.

It is possible to adopt both the aspect of the invention of switching the rotation rate of the lapping plate in the lapping machine used for lapping at least once when the resistance value or the MR height converted from the resistance value falls below a reference value, and the aspect of the invention of continuing lapping until the lapping time exceeds a predetermined time and the resistance or the MR height converted from the resistance value falls into the finish tolerances.

Preferably, lapping includes the two stages of rough lapping and finish lapping, and the predetermined lapping time corresponds to the time that has elapsed from the beginning of finish lapping.

Lapping may include the two stages of rough lapping and finish lapping, and the rotation rate may be switched during finish lapping.

Rough lapping, which places more importance on lapping speed than on lapping accuracy, is performed at a high speed until the MR height approaches a target value, and it is switched to finish lapping, which places importance on lapping accuracy, when the MR height comes close to the target value. This can increase the lapping accuracy and shortens the overall lapping time.

In these two stages, rough lapping and finish lapping, by monitoring whether the finish lapping time is longer than a predetermined time, it is possible to prevent, for example, insufficient lapping of the substrate, which will result in a large recession, when the recession in rough lapping is too large, that is, when the thin-film magnetic element has been subjected to a greater degree of lapping than the substrate, and lapping is completed in a short time of subsequent finish lapping.

The aspect of the invention in which the finish lapping time has been monitored to determine if its has exceeded the predetermined time may be carried out by monitoring the time elapsed from the beginning of lapping in a method having a single lapping stage instead of the two stages of rough lapping and finish lapping.

Similarly, the rotation rate may be switched in the method having a single lapping stage.

Preferably, the predetermined lapping time is set to be, for example, more than two minutes, more preferably, more than three minutes.

Preferably, the rotation rate of the lapping plate is, for example, 70 to 100 rpm before switching, and is 5 to 20 rpm after switching.

In the present invention, the recession from the thin-film magnetic element to the surface of the substrate opposing the recording medium may be measured after the completion of finish lapping, and the lapping conditions of the next lapping may be changed so that the recession, or the MR height or resistance of the magnetoresistive sensor, is appropriate.

The time from the beginning of finish lapping to the completion of finish lapping may be measured, and the lapping conditions of the next lapping may be changed so that the measured lapping time is within a predetermined range.

The lapping conditions may include, for example, the amount of adjustment of the MR height during rough lapping and the timing for feeding a lubricant during finish lapping.

Preferably, a plurality of different lapping conditions, such as the MR height in rough lapping and the timing for feeding a lubricant in finish lapping, are ranked, listed in a table, stored, and selected from the table by selecting the rank.

When the lapping conditions necessary for lapping are collected, ranked according to the MR heights, listed in a table, and stored according to the lapping machine, the operator can set the lapping conditions (MR height, the lubricant feeding time) for the next lapping simply by selecting the rank in the lapping conditions in the table based on data from the results of the previous lapping (recession, MR height or resistance, finish lapping time). Therefore, it is possible to shorten the time taken for setting, to reduce setting errors, and to improve the quality and yield of thin-film magnetic heads.

In the present invention, lapping may be performed with reference to the resistance, or the MR height may be converted from the resistance so that it is determined base on the converted value whether the lapping amount of the finishing value is appropriate.

That is, when the resistance of the magnetoresistive sensors is measured in the above methods, lapping may be performed while monitoring the resistance as it falls into a predetermined range or the finish tolerances, whereas the lapping state may be monitored using the MR height converted from the resistance.

According to another aspect of the present invention, there is provided a manufacturing apparatus for carrying out the above-described thin-film magnetic element manufacturing method, including a holding means for holding a thin-film magnetic head in which a thin-film magnetic element including a magnetoresistive sensor is formed on a substrate; a lapping machine for lapping the substrate and the thin-film magnetic element in the thin-film magnetic head held by the holding means; a resistance measuring means for measuring the resistance of the magnetoresistive sensor during lapping; and a control means for monitoring the resistance measured by the resistance measuring means or the MR height converted from the resistance, determining whether the lapping time exceeds a predetermined time, and controlling the lapping machine until the lapping time exceeds the predetermined time and the resistance or the MR height falls into finish tolerances.

According to another aspect of the present invention, there is provided a manufacturing apparatus for carrying out the above-described thin-film magnetic element manufacturing method, including a holding means for holding a thin-film magnetic head in which a thin-film magnetic element including a magnetoresistive sensor is formed on a substrate; a lapping machine for lapping the substrate and the thin-film magnetic element in the thin-film magnetic head held by the holding means; a resistance measuring means for measuring the resistance of the magnetoresistive sensor during lapping; a speed changing means for changing the rotation rate of a lapping plate in the lapping machine; and a control means for monitoring the resistance measured by the resistance measuring means or the MR height converted from the resistance, and controlling the speed changing means so that the rotation rate of the lapping plate in the lapping machine is switched to a lower rate at least once when the resistance or the MR height converted from the resistance falls below a reference value.

According to a further aspect of the present invention, there is provided a manufacturing apparatus for carrying out the above-described thin-film magnetic element manufacturing method, including a holding means for holding a thin-film magnetic head in which a thin-film magnetic element including a magnetoresistive sensor is formed on a substrate; a lapping machine for lapping the substrate and the thin-film magnetic element in the thin-film magnetic head held by the holding means; a resistance measuring means for measuring the resistance of the magnetoresistive sensor during lapping; a speed changing means for changing the rotation rate of a lapping plate in the lapping machine; and a control means for monitoring the resistance measured by the resistance measuring means or the MR height converted from the resistance, determining whether the lapping time exceeds a predetermined time, controlling the lapping machine until the lapping time exceeds the predetermined time and the resistance or the MR height falls into finish tolerances, and controlling the speed changing means so that the rotation rate of the lapping plate in the lapping machine is switched to a lower rate at least once when the resistance or the MR height converted from the resistance falls below a reference value.

Preferably, the lapping machine performs lapping in two stages of rough lapping and finish lapping and the control means measures the lapping time from the beginning of finish lapping, or the lapping machine performs lapping in two stages of rough lapping and finish lapping and is controlled by the control means so that the rotation rate of the lapping plate is switched during finish lapping.

Preferably, the apparatus further includes a memory device for storing a table containing a plurality of ranked lapping conditions, and the control means sets, as a lapping condition for the next lapping, the lapping condition read from the table according to the finishing result of finish lapping.

Further objects, features, and advantages of the present invention will be apparent from the following description of the preferred embodiments with reference to the attached drawings.

DESCRIPTION OF THE PREFERRED EMBODIMENTS

Figure 5:
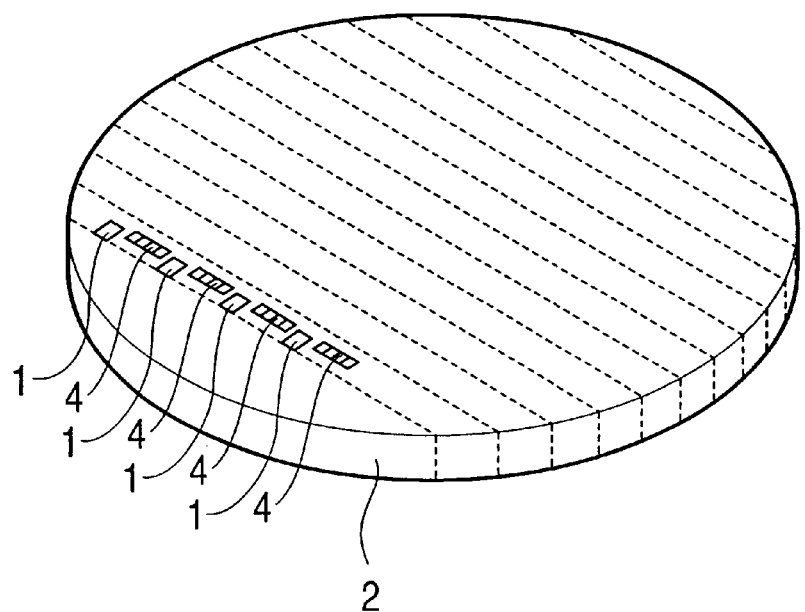
FIG. 5 is a perspective view showing a state in which thin-film magnetic elements are formed on a substrate.

In the procedure for manufacturing a thin-film magnetic head, plural thin-film magnetic elements 1 are formed on a substrate 2 made of $Al_2O_3$—TiC (alumina titanium carbide) or the like by a thin-film process, as shown in FIG. 5. The substrate 2 shown in FIG. 5 is shaped like a disk, and plural thin-film magnetic elements 1 are formed in plural rows at regular intervals.

Figure 7:
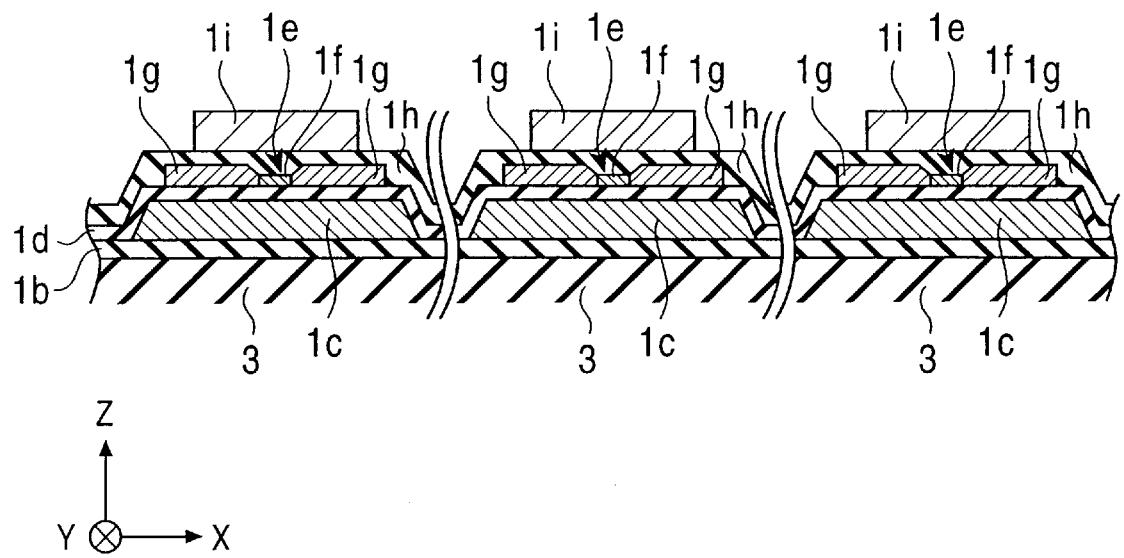
FIG. 7 is a cross-sectional view of the thin-film magnetic elements on the slider bar shown in FIG. 5, as viewed from the direction of the ABS.
Figure 11A:
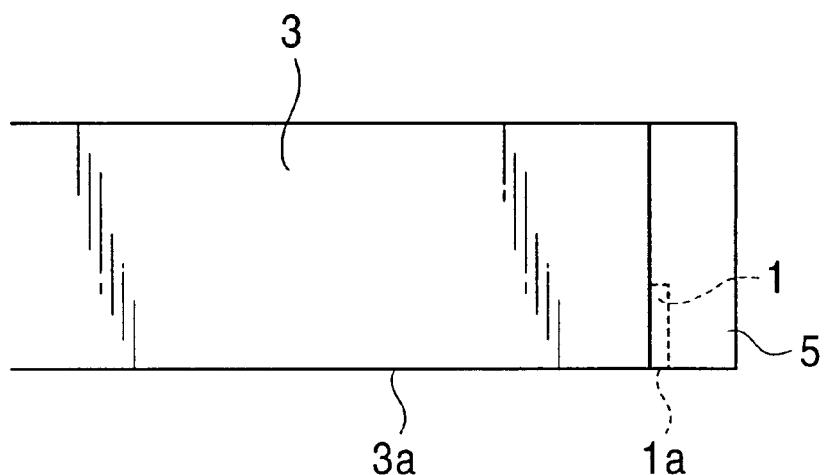
FIGS. 11A and 11B are partial side views of the slider bar shown in FIG. 6 to be lapped by the lapping plate shown in FIG. 8, respectively, showing the states at the beginning of lapping, and during or after lapping.
Figure 11B:
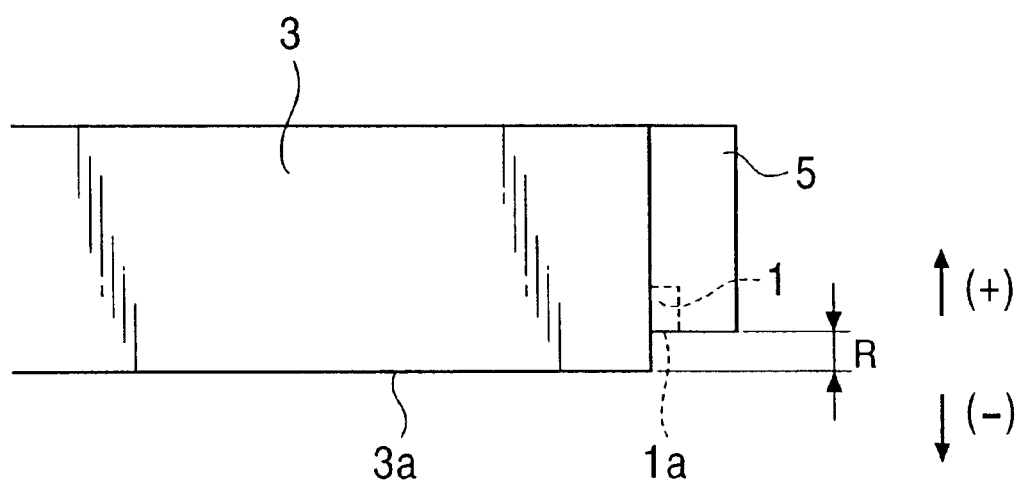

FIG. 7 is a partial enlarged sectional view of the thin-film magnetic elements 1 on a slider bar 3 cut along an ABS 3a. A thin-film magnetic head 1 is a combination of an inductive magnetic head and an MR magnetic head using a magnetoresistive sensor. FIG. 7 shows only the MR magnetic heads in the thin-film magnetic heads 1, and does not show the inductive magnetic heads and a cover layer for covering the thin-film magnetic elements 1 (see FIG. 11).

As shown in FIG. 7, an underlying insulating layer 1b of $Al_2O_3$ or the like is formed on the slider bar 3. On the underlying insulating layer 1b, a lower shielding layer 1c is made of a magnetic material, such as a NiFe alloy. Furthermore, a lower gap layer 1d is made of an insulating material, such as $Al_2O_3$, on the lower shielding layer 1c. On the lower gap layer 1d, a plurality of magnetoresistive sensors 1e are arranged in a row in the direction of the ABS (in the X-direction in FIG. 7).

In the center of the magnetoresistive sensor 1e, a multilayer film 1f is formed of a spin-valve film (a kind of GMR (giant magnetoresistive) element) composed of, for example, an antiferromagnetic layer, a pinned magnetic layer, a nonmagnetic conductive layer, and a free magnetic layer. On both sides of the multilayer film 1f, electrode layers 1g are made of a nonmagnetic metal material such as Cr (chromium).

An upper gap layer 1h of an insulating material, such as $Al_2O_3$, is formed on the magnetoresistive sensor 1e, and an upper shielding layer 1i of a NiFe alloy (permalloy) or the like is formed on the upper gap layer 1h.

The multilayer film 1f is an element using a giant magnetoresistive effect, in which the electric resistance changes according to changes of the leakage field from a recording medium, whereby recording signals are detected.

Figure 6:
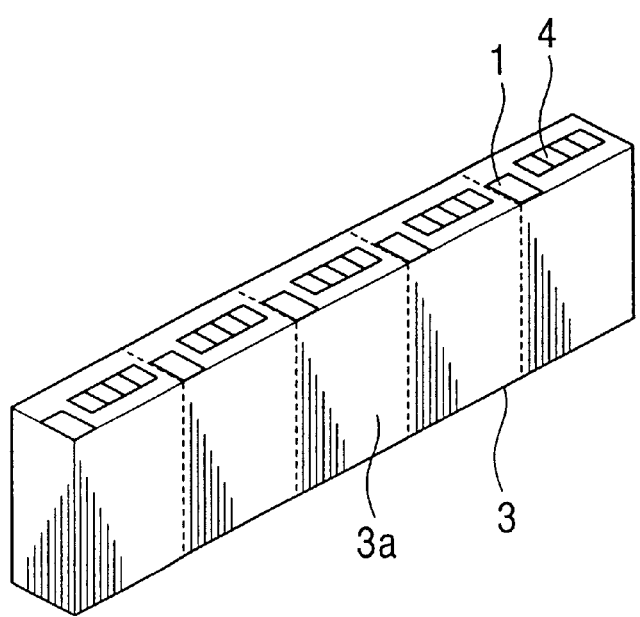
FIG. 6 is a perspective view of a slider bar cut from the substrate shown in FIG. 5.

By cutting the substrate 2 shown in FIG. 5 along the dotted lines, a slider bar 3 is formed, as shown in FIG. 6. Some of the thin-film magnetic elements 1 formed on the slider bar 3 are used as monitor elements. The ABS 3a is lapped while measuring DC resistance values (DCR value) between the electrode layers 1g, thereby determining the height (the length in the Y-direction) of the multilayer films 1f constituting the magnetoresistive sensors 1e.

While the DC resistance (DCR) of the thin-film magnetic element is measured in this embodiment, it is possible to apply alternating current to the thin-film magnetic element and to measure the AC resistance (impedance).

Figure 8:
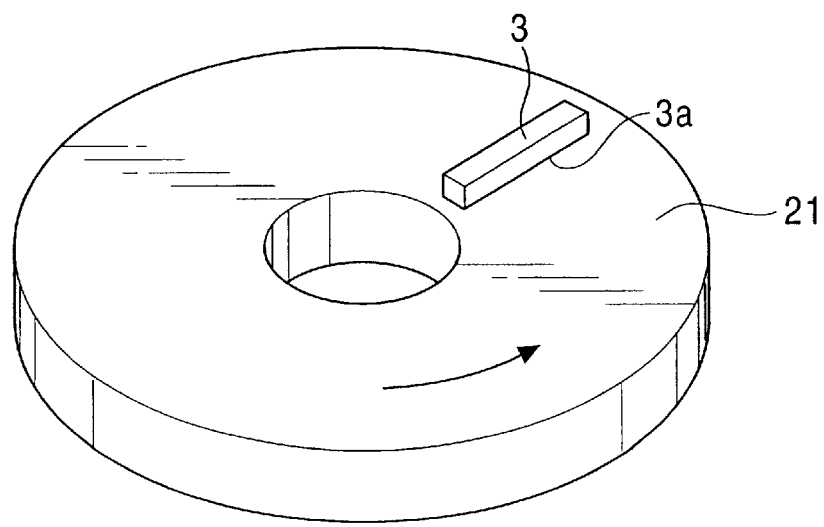
FIG. 8 is a perspective view of a lapping plate for use in lapping the ABS of the slider bar shown in FIG. 5.
Figure 9A:
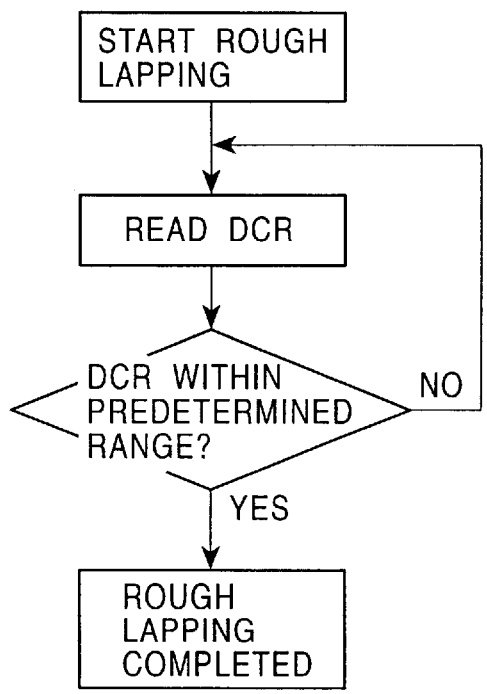
FIGS. 9A and 9B are flowcharts showing a lapping process in a conventional thin-film magnetic head manufacturing method.
Figure 9B:
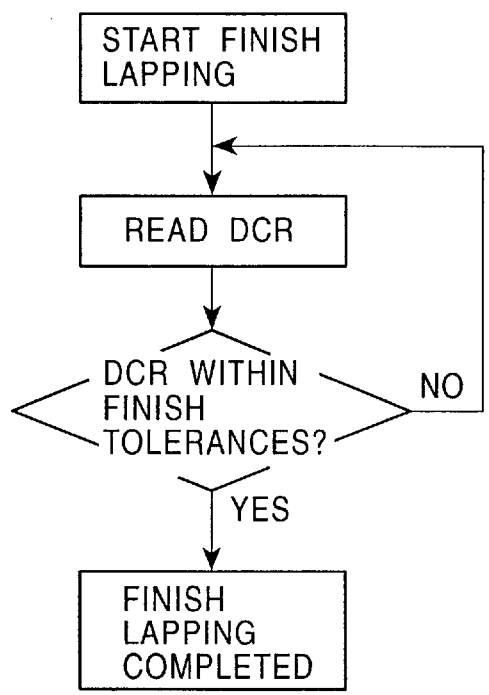

The slider bar 3 is lapped by rotating a lapping plate 21 shown in FIG. 8 and putting the ABS 3a of the slider bar 3 into contact with the surface of the lapping plate 21.

FIGS. 1 and 2 are flowcharts showing the lapping process.

In this embodiment, lapping for adjusting the height of the thin-film magnetic elements 1 placed on the slider bar 3 is performed in two stages, rough lapping and finish lapping.

Rough lapping is performed by applying on the lapping plate 21 a lapping fluid containing diamond polycrystalline fine particles having an average particle diameter of 0.1 µm to 50.5 µm.

Figure 1A:
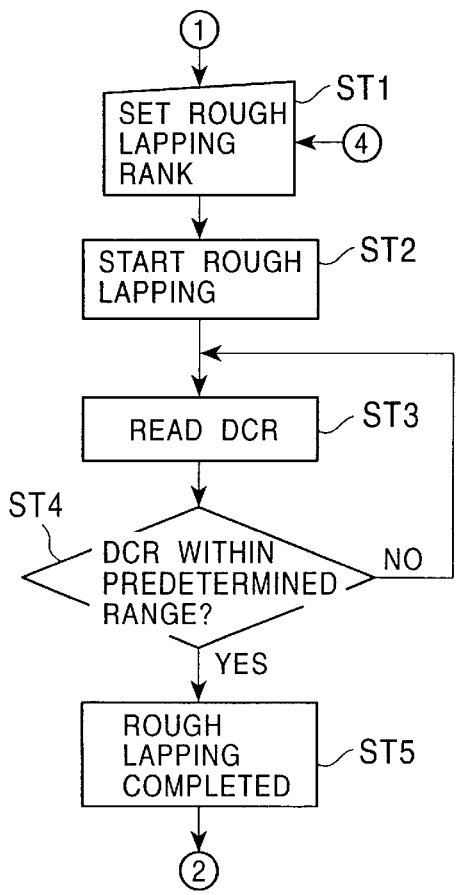
FIGS. 1A and 1B are flowcharts showing a thin-film magnetic head manufacturing method according to an embodiment of the present invention.

In the rough lapping process, as shown in FIG. 1A, rank setting for rough lapping is made in Step 1 (ST1). The rank setting will be described later with reference to Tables 1, 2, and 3. Rough lapping using the lapping plate 21 is started in Step ST2, and the above-described DCR is read during lapping in Step ST3. When the DCR falls into a predetermined range, rough lapping is completed in Step ST4. In this rough lapping process, the slider bar 3 is lapped so that the DCR comes close to a finishing value in a short time. While it is watched in Step ST4 whether the DCR is within the predetermined range, it is possible to convert the DCR to the height of the magnetoresistive sensor (multilayer film 1f) and to complete rough lapping when the converted value falls into a predetermined value.

Figure 1B:
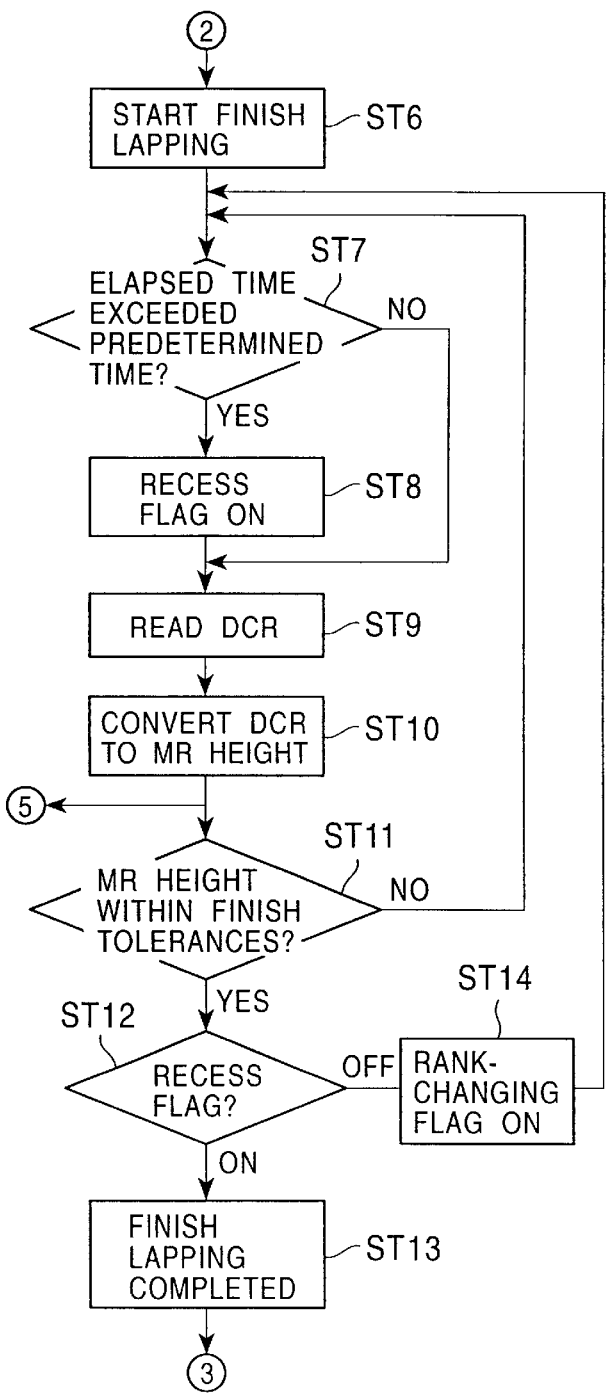

Next, finish lapping is performed, as shown in FIG. 1B. In finish lapping, a lubricant is supplied on the lapping plate 21. The timing for feeding the lubricant is based on the lapping rank shown in Table 1, as will be described later.

In the finish lapping process shown in FIG. 1B, the time is monitored from the beginning of finish lapping (ST6) in Step ST7. The time is obtained from the measurement result shown in FIG. 3, as will be described below, and is, for example, more than two minutes, more preferably, more than three minutes. The time is thus preset, and a recess flag is set when the elapsed time exceeds the preset time.

Next, the DCR is read in Step ST9, and is converted to an MR height in Step ST10. In Step ST11, it is determined whether the MR height falls into the finish tolerances. When the MR height is out of the finish tolerances, finish lapping is continued, and the determination is repeated. In this case, it may be determined in Step ST11 only by monitoring the DCR, without converting the DCR to the MR height, whether finish lapping has been properly performed.

When the MR height falls into the finish tolerances, it is determined in Step ST12 whether the recess flag is set to be on or off. When the recess flag is set to be on, the elapsed time exceeds the preset time. Since both the conditions are satisfied, that is, the preset time has elapsed and the MR height is within the finish tolerances, finish lapping is completed (Step ST13).

When the recess flag is not on in Step ST12, the MR height is within the finish tolerance, whereas the ABS 3a of the slider bar 3 has not been sufficiently lapped and there is a high probability that the a substantial recession remains. In this case, lapping is continued, the elapsed time is checked again in Step ST7, and it is determined in Step ST11 whether the MR height is within the finish tolerance range. In a case in which the MR height is out of the finish tolerance range even when the above operations are repeated, the slider bar 3 is judged defective.

By always continuing finish lapping for more than the preset time, the ABS 3a of the slider bar 3, which is lapped at a low rate, can be sufficiently lapped, and the recession R between the ABS 3a and an opposing surface 1a of the thin-film magnetic element 1 (see FIG. 11B) can be minimized. In a case in which too large a recession R remains at the completion of rough lapping, both the conditions are not satisfied, that is, the finish lapping time does not exceed the preset time and the MR height is out of the finish tolerance range, and therefore, the slider bar 3 is judged defective.

Figure 3:
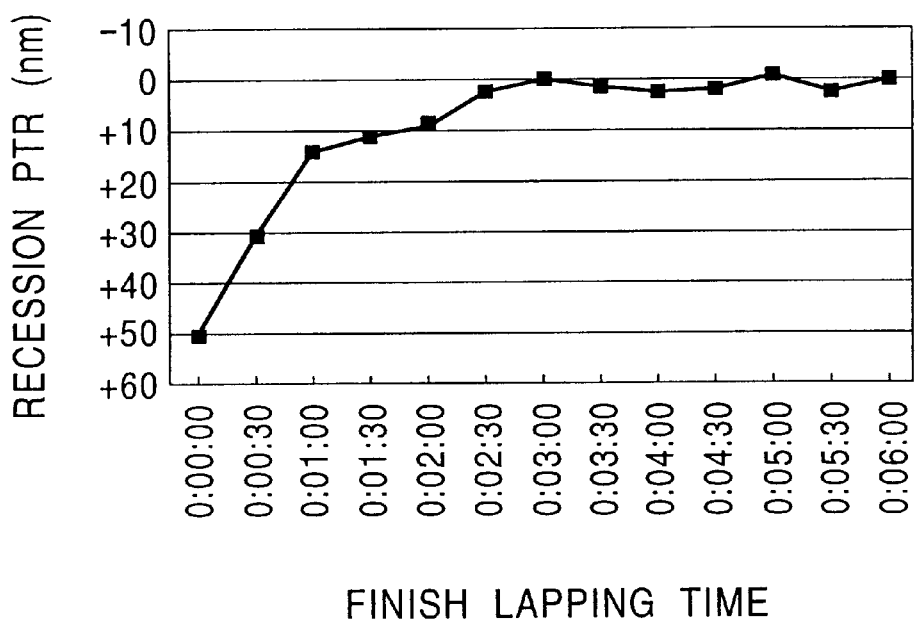
FIG. 3 is a graph showing the relationship between finish lapping time and a recession.

FIG. 3 shows an example of result of measurement taken to determine the preset time in Step ST7. In this graph, the horizontal axis represents the elapsed finish lapping time, and the vertical axis represents the recession between the ABS 3a of the slider bar 3 and the opposing surface 1a of the thin-film magnetic element 1. The recession is zero when the opposing surface 1a of the thin-film magnetic element 1 is flush with the ABS 3a of the slider bar 3, and the direction in which the recession increases is designated the "positive direction".

The slider bar 3 is made of $Al_2O_3$—TiC, and the thin-film magnetic element 1 is multilayer element made of $Al_2O_3$, NiFe, Cu, and so on.

According to the measurement result shown in FIG. 3, the recession decreases to 10 nm two minutes after the beginning of finish lapping, and decreases approximately zero three minutes after and remains stably. Therefore, a preferable finish lapping time is more than two minutes, more preferably, more than three minutes.

When the elapsed time is preset at more than two or three minutes as described above, the recession can fall within a range of 0 nm to 10 nm. Since the recession conventionally ranges from 0 nm to 30 nm, it is possible to substantially reduce the increase and variations in recessions by performing finish lapping while measuring the elapsed time. This improves the quality of the thin-film magnetic elements, in particular, to reduce the spacing loss and to thereby improve writing/reading characteristics.

Figure 2A:
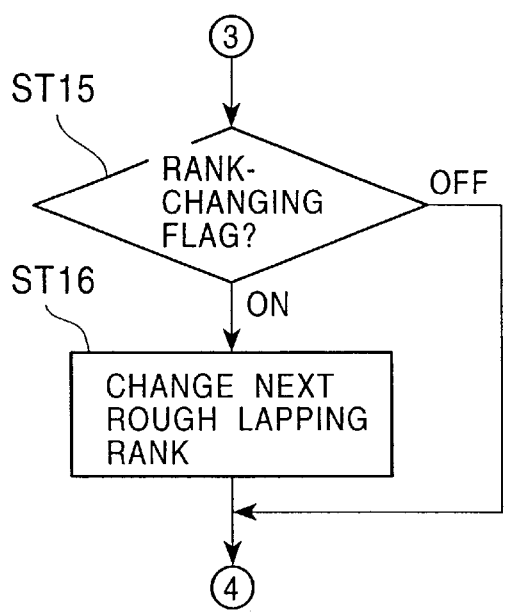
FIGS. 2A and 2B are flowcharts showing the steps subsequent to ③ or ⑤ in FIG. 1B.
Figure 2B:
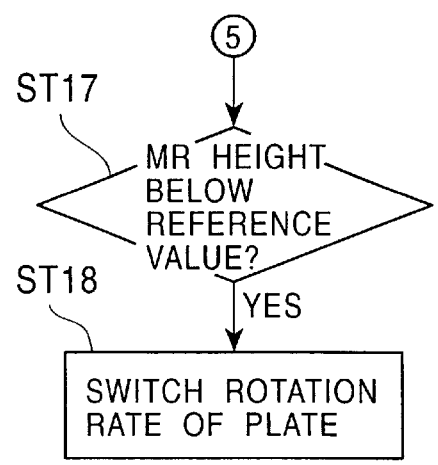

In the finish lapping process shown in FIG. 1B, Steps ST17 and ST18 shown in FIG. 2B may be added before the MR height (or the DCR) falls into the finish tolerance in Step ST11.

When finish lapping comes close to the end and the MR height falls below a reference value in Step ST17 of FIG. 2B, the rotation rate of the lapping plate 21 is switched to a lower rate at least once (ST 18). When the MR height falls into the finish tolerance range in Step ST11 after switching, the lapping plate 21 is stopped to complete finish lapping.

In this embodiment, the rotation rate of the lapping plate 21 is set at approximately 100 rpm before the switching to a lower rate in Step ST18. While the DCR is converted to the MR height and it is determined in Step ST17 whether the MR height falls below the reference value, for example, the rotation rate of the lapping plate 21 is switched to approximately 20 rpm when the MR height falls below the sum of the finishing value +0.5 μm to 1 μm.

Figure 4:
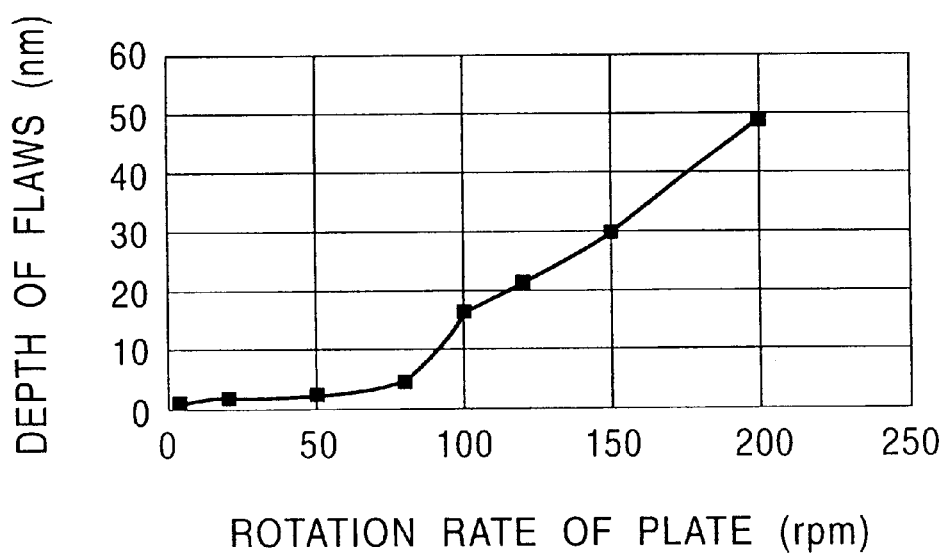
FIG. 4 is a graph showing the relationship between the rotation rate of a lapping plate immediately before a lapping machine is stopped and the depth of flaws produced on an ABS of a slider bar and a thin-film magnetic element when the lapping machine is stopped.

FIG. 4 is a graph showing the relationship between the rotation rate of the lapping plate 21 immediately before the lapping machine is stopped and the depth of flaws produced on the slider bar 3 and the thin-film magnetic element 1 after the lapping machine is stopped. When the lapping plate 21 of the lapping machine, which is rotating at, for example, approximately 100 rpm, is stopped by trapezoidal driving control, the depth of flaws produced on the slider bar 3 and the thin-film magnetic element 1 ranges from 5 nm to 20 nm. In contrast, when the lapping plate rotating at, for example, approximately 20 rpm is stopped by trapezoidal driving control, the depth of flaws falls into the range of 1 nm to 2 nm.

While the rotation rate of the lapping plate is switched only once in this embodiment, it may be switched any number of times.

The flowchart shown in FIG. 1B need not always include the step of switching the rotation rate of the lapping plate shown in FIG. 2B. Furthermore, only the step of switching the rotation rate of the plate in FIG. 2B may be performed without performing the step of checking the elapsed time in FIG. 1B.

The step of checking the elapsed time in FIG. 1B and/or the step of switching the rotation rate of the plate in FIG. 2B may be performed in a single lapping stage, instead of two stages of rough lapping and finish lapping.

In the lapping process, a table may be formed to include ranked lapping conditions necessary for lapping settings, and the lapping conditions may be changed stepwise based on actual lapping circumstances for individual lapping machines.

For example, in the process shown in FIG. 1B, even when the MR height or the DCR of the magnetoresistive sensor is within the finish tolerances, the elapsed time sometimes does not exceed the predetermined time in Step ST7. This is because the thin-film magnetic element 1 is subjected to a greater degree of lapping than the ABS 3A of the slider bar 3 in rough lapping shown in FIG. 1A, and a substantially large recession R has been formed when rough lapping is shifted to finish lapping.

Furthermore, if the DCR set in Step ST4 in the rough lapping process shown in FIG. 1A is too great, that is, if the height of the thin-film magnetic element 1 is reduced excessively (lapping is performed excessively) in rough lapping, too large a recession R is similarly produced, and the DCR sometimes falls into the finish tolerance range before the predetermined time elapses in finish lapping shown in FIG. 1B.

The finish lapping process shown in FIG. 1B is also influenced by the timing for feeding a lubricant onto the lapping plate 21. In finish lapping, the recession between the ABS 3a of the slider bar 3 and the thin-film magnetic element 1 must be reduced by lapping the ABS 3a for more than the predetermined time. The recession is influenced by the timing for feeding the lubricant.

Therefore, if the recess flag is not set to be on even when the MR height is within the finish tolerance range in Step ST11 shown in FIG. 1B, a rank-changing flag is set in Step ST14. Then, as shown in FIG. 2A, it is determined in Step ST15 whether the rank-changing flag is set to be on at the completion of finish lapping. When the rank-changing flag is set to be on, a rank for the next rough lapping process is changed in Step ST16 (ST1). Moreover, the timing for feeding the lubricant in finish lapping is changed.

The following Table 1 shows examples of the above-described lapping conditions (lapping ranks).

TABLE 1

| Rank | MR Height in Rough Lapping ($\mu$M) | DCR in Feeding Lubricant ($\Omega$) |
|---|---|---|
| 1 | 0.9 | a |
| 2 | 0.8 | b |
| 3 | 0.7 | c |
| 4 | 0.6 | d |
| 5 | 0.5 | e |

In Table 1, the MR height in rough lapping and the timing for feeding a lubricant for finish lapping are set in combination as lapping conditions (lapping ranks). The lubricant feeding timing is represented as the DCR of the magnetoresistive sensor. Furthermore, ranks are set according to the MR height after rough lapping. A case in which the MR height after rough lapping is 0.9 $\mu$m, a case in which the MR height is 0.8 $\mu$m, a case in which the MR height in 0.7 $\mu$m, etc., are respectively set as ranks 1, 2, 3, etc. While the DCR when feeding the lubricant for finish lapping is represented by a, b, c, d, and e in Table 1, it is actually set at an optimal value for each lapping machine 32.

For example, in a case in which Rank 1 is set in Step ST1 in FIG. 1A, when the rank-changing flag is set to be on in Step ST15 in FIG. 2A, the rank is changed in the next lapping process (the next slider bar 3 or the next lot). In this case, it is preferable to create a table of ranks, for example, based on the excess amount of DCR (the amount of deviation from the finishing height) in finish lapping, as shown in Table 3.

The change in lapping ranks makes it possible to decrease the probability that slider bars will be defective in Step ST12 in the finish lapping process shown in FIG. 1B, and to reduce the overall lapping time. Furthermore, it is possible to reduce the influence of differences in characteristics of lapping machines, and to achieve uniform quality. Table 2 shows comparisons of recessions, DCRs, and finish lapping times among sample slider bars having thin-film magnetic elements subjected to rough lapping and finish lapping performed by three lapping machines.

TABLE 2

|  | Machine 1 | Machine 2 | Machine 3 |
|---|---|---|---|
| Rank | 3 | 3 | 3 |
| Lapping time (min:sec) | 3:10 | 2:00 | 2:00 |
| Recession (nm) | −1.5 | −1.3 | −0.7 |
| Excess DCR ($\Omega$) | Within Tolerances | +2 | +5 |

The above Table 2 shows the lapping results of the three lapping machines 1, 2, and 3 when all the lapping ranks of the lapping machines are set at Rank 3 shown in Table 1, and when the reference time in Step ST7 in the finish lapping process shown in FIG. 1B is set at 2 minutes.

Referring to Machine 1, the DCR is within the tolerances, and the finish lapping time is 3 minutes and 10 seconds. In contrast, in Machines 2 and 3, the DCR values thereof exceed the tolerances by 2 $\Omega$ and 5 $\Omega$, respectively, when the predetermined finish lapping time, two minutes, has elapsed. These are not desirable as finish lapping results. In Step ST14, the rank-changing flag is turned on.

Accordingly, the lapping ranks of Machines 2 and 3 are changed. In this case, the lapping ranks are changed based on the following rank-changing table 3 set according to the excess DCR values in finish lapping.

While the rank is selected based on the DCR value in Table 3, it may be based on the MR height calculated from the DCR value.

TABLE 3

|  |  | Rank |
|---|---|---|
| Excess DCR ($\Omega$) | Within tolerances | Rank 3 |
|  | 1 | Rank 3 |
|  | 2 | Rank 2 |
|  | 3 | Rank 2 |
|  | 4 | Rank 1 |
|  | 5 | Rank 1 |

DCR values of samples lapped by Machines 2 and 3 exceed the tolerances by 2 $\Omega$ and 5 $\Omega$, respectively. That is, the height of the thin-film magnetic element is excessively reduced in rough lapping. Accordingly, the ranks of machines 2 and 3 are respectively changed to rank 2 and rank 3. That is, the amount of the height of the thin-film magnetic element to be reduced in rough lapping is reduced. Table 4 shows the results of rough lapping and finish lapping after this change.

TABLE 4

|  | Machine 2 | Machine 3 |
|---|---|---|
| Rank | 2 | 3 |
| Lapping time (min:sec) | 2:15 | 3:52 |
| Recession (nm) | −2.4 | −3.1 |
| Excess DCR ($\Omega$) | within tolerances | within tolerances |

The finish lapping results in Table 4 show that the DCR values of Machines 2 and 3 fall into the tolerances after the rank change.

When the finish lapping time is long, it can be shortened by changing rough lapping conditions.

For example, it is possible to shorten the finish lapping time according to a lapping rank changing table shown in Table 5.

TABLE 5

|  |  | Finish lapping time (min) | | |
|---|---|---|---|---|
|  |  | 2 to 3 | 3 to 4 | 4 to 5 |
| Excess DCR ($\Omega$) | Within tolerances | rank 3 | rank 4 | rank 5 |
|  | 1 | rank 3 | rank 4 | rank 5 |
|  | 2 | rank 2 | rank 3 | rank 4 |
|  | 3 | rank 2 | rank 3 | rank 4 |
|  | 4 | rank 1 | rank 2 | rank 3 |
|  | 5 | rank 1 | rank 2 | rank 3 |

Table 5 shows a rank-changing table for use in setting a rank for the next lapping process based on the finish lapping time and the DCR values of the samples in the previous lapping process performed in Rank 3. When the DCR value is within the tolerances and the finish lapping time is equal to or more than 2 minutes and less than 3 minutes in the previous lapping process in Rank 3, the rank need not be changed, and therefore, the next lapping process is performed in Rank 3. If the DCR value is within the tolerances and the finish lapping time is equal to or more than 4 minutes and less than 5 minutes in the lapping process in Rank 3, the MR height is insufficiently reduced in rough lapping in Rank 3, as shown in Table 1, and too much time is taken for the MR height to fall into the finish tolerance range in finish lapping. Accordingly, in this case, finish lapping time can be shortened by changing the rank to Rank 5.

Figure 10:
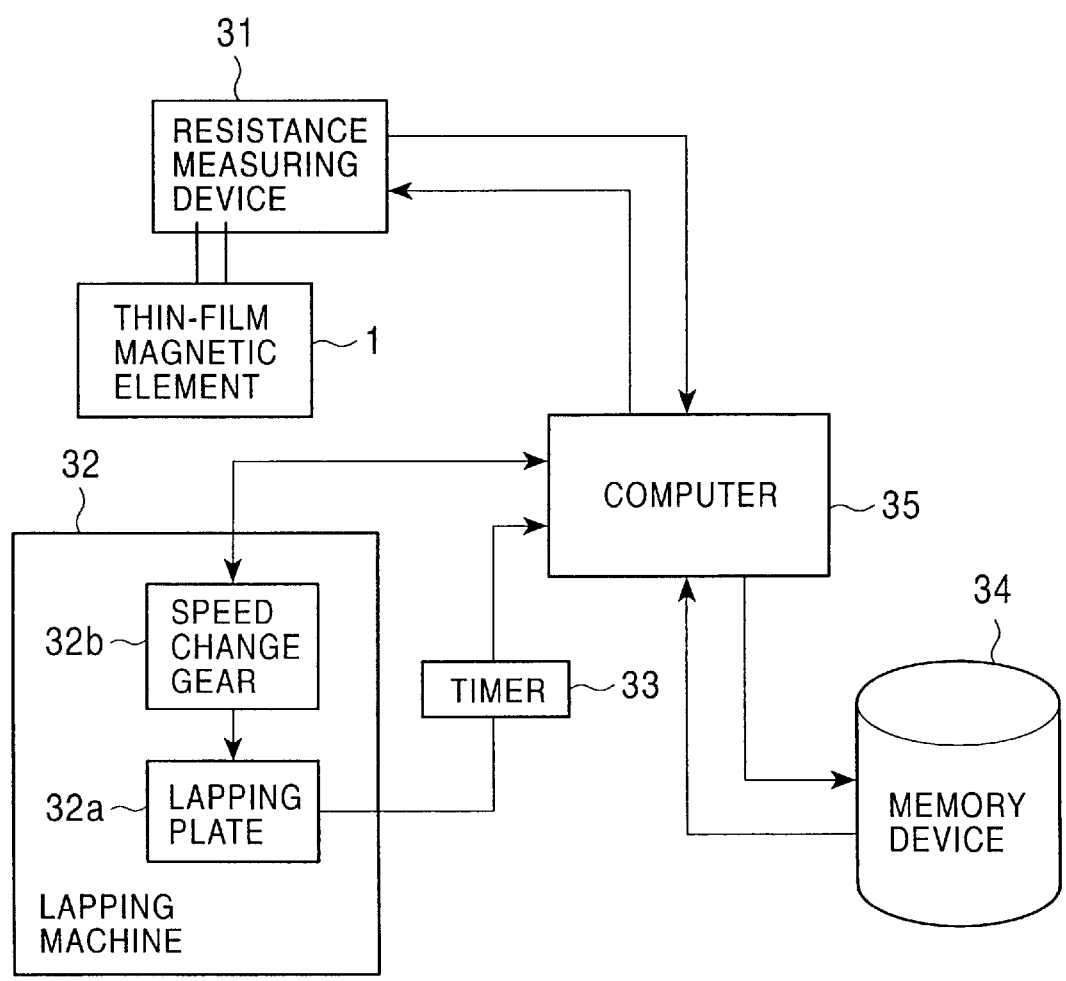
FIG. 10 is a block diagram of a thin-film magnetic head manufacturing apparatus according to an embodiment of the present invention.

FIG. 10 is a block diagram of a thin-film magnetic head manufacturing apparatus according to an embodiment of the present invention.

In the thin-film magnetic head manufacturing apparatus shown in FIG. 10, the resistance values of the magnetoresistive sensors of the thin-film magnetic elements 1 formed on the slider bar 3 shown in FIG. 6 are measured by a resistance measuring device 31 serving as a resistance measuring means of the present invention, and the ABS 3*a* of the slider bar 3 and the thin-film magnetic elements 1 in the thin-film magnetic head are lapped by the lapping machine 32 in the direction of the height, thereby adjusting the MR height.

A computer 35 constructs a control means of the present invention. The computer 35 controls the resistance measuring device 31 and the lapping machine 32, receives data therefrom, converts the resistances of the magnetoresistive sensors to MR heights, refers to the lapping condition tables in a memory device 34, displays data, such as measured resistance values, and gives instructions to the operator.

The time in which the thin-film magnetic elements 1 are lapped by the lapping machine 32 is measured by a timer 33 connected to the lapping machine 32. Furthermore, the computer 35 controls the lapping machine 32 so that the lapping machine 32 continues lapping until the lapping time exceeds a predetermined time and the resistance value or the MR height converted from the resistance value falls into the finish tolerances.

The lapping machine 32 has also a speed change gear 32*b* serving as a speed changing means for changing the rotation rate of the lapping plate 32*a* in a stepwise manner. The computer 35 controls the speed change gear 32*b* so that the rotation rate of the lapping plate 32*a* is switched to a lower rate at least once to complete lapping when the resistance of the thin-film magnetic element 1 or the MR height converted from the resistance value falls below the reference value.

In the block diagram of FIG. 10, the speed change gear 32*b* may be omitted, or the timer 33 may be omitted.

In the thin-film magnetic head manufacturing apparatus of this embodiment, the lapping machine performs lapping in two stages, rough lapping and finish lapping, whereas the lapping machine may perform a single-stage lapping.

The tables, as in Tables 3 and 5, showing a plurality of different rough and finish lapping condition ranks may be stored as a database in the memory device 34, and be read when the rank change is required. The memory device 34 may be connected to the computer 35 connected to the lapping machine directly or via a network.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A thin-film magnetic head manufacturing method comprising:
   forming a thin-film magnetic element having a magnetoresistive sensor by stacking thin-film layers, including an insulating layer, a magnetic layer, and a conductive layer, on a substrate;
   adjusting a MR height by lapping said substrate and said thin-film magnetic element in a height direction while measuring a resistance value of said magnetoresistive sensor; and
   decreasing a rotation rate of a lapping plate in a lapping machine to a lower rate at least once to complete lapping when one of the resistance value and the MR height converted from the resistance value falls below a respective reference value.

2. A thin-film magnetic head manufacturing method comprising:
   forming a thin-film magnetic element having a magnetoresistive sensor by stacking thin-film layers, including an insulating layer, a magnetic layer, and a conductive layer, on a substrate;
   adjusting a MR height by lapping said substrate and said thin-film magnetic element in a height direction while measuring a resistance value of said magnetoresistive sensor; and
   decreasing a rotation rate of a lapping plate in a lapping machine to a lower rate at least once to complete lapping when one of the resistance value and the MR height converted from the resistance value falls below a respective reference value; and
   continuing lapping until a lapping time exceeds a predetermined time and one of the resistance value and the MR height converted from the resistance value decreases to finish tolerances.

3. A thin-film magnetic head manufacturing method according to claim 2, the lapping comprising rough lapping and finish lapping, the method further comprising comparing the predetermined time to a time that has elapsed from a beginning of the finish lapping.

4. A thin-film magnetic head manufacturing method according to claim 3, further comprising setting the predetermined time to longer than two minutes.

5. A thin-film magnetic head manufacturing method according to claim 3, further comprising:
   measuring a recession from said thin-film magnetic element to a surface of said substrate opposing a recording medium after completion of lapping;
   changing a lapping condition of a next lapping such that one of the recession, the MR height, and the resistance value of said magnetoresistive sensor, is appropriate;
   setting the lapping condition to include the MR height in rough lapping;
   ranking a plurality of different lapping conditions, listing the plurality of different lapping conditions in tables, storing the table in a memory device, and selecting the next lapping condition from said table by selecting a rank of a desired lapping condition of the plurality of different lapping conditions ranked, listed, and stored in the table.

6. A thin-film magnetic head manufacturing method according to claim 3, further comprising:
   timing feeding of a lubricant during finish lapping to determine a lubrication time;
   measuring a recession from said thin-film magnetic element to a surface of said substrate opposing a recording medium after completion of lapping;

changing a lapping condition of a next lapping such that one of the recession, the MR height, and the resistance value of said magnetoresistive sensor, is appropriate;

setting the lapping condition to include the lubrication time;

ranking a plurality of different lapping conditions, listing the plurality of different lapping conditions in a table, storing the table in a memory device, and selecting the next lapping condition from said table by selecting a rank of a desired lapping condition of the plurality of different lapping conditions ranked, listed, and stored in the table.

7. A thin-film magnetic head manufacturing method according to claim 3, further comprising:

measuring the time from the beginning of finish lapping to a completion of finish lapping;

changing a lapping condition of a next lapping such that the lapping time is within a predetermined range;

setting the lapping condition to include the MR height in rough lapping;

ranking a plurality of different lapping conditions, listing the plurality of different lapping conditions in a table, storing the table in a memory device, and selecting the next lapping condition from said table by selecting a rank of a desired lapping condition of the plurality of different lapping conditions ranked, listed, and stored in the table.

8. A thin-film magnetic head manufacturing method according to claim 3, further comprising:

timing feeding of a lubricant during finish lapping to determine a lubrication time;

measuring the time from the beginning of finish lapping to a completion of finish lapping;

changing a lapping condition of a next lapping such that the lapping time is within a predetermined range;

setting the lapping condition to include the lubrication time;

ranking a plurality of different lapping conditions, listing the plurality of different lapping conditions in a table, storing the table in a memory device, and selecting the next lapping condition from said table by selecting a rank of a desired lapping condition of the plurality of different lapping conditions ranked, listed, and stored in the table.

9. A thin-film magnetic head manufacturing method according to claim 3, further comprising:

measuring the time from the beginning of finish lapping to a completion of finish lapping;

changing a lapping condition of a next lapping such that the lapping time is within a predetermined range;

ranking a plurality of different lapping conditions, listing the plurality of different lapping conditions in a table, storing the table in a memory device, and selecting the next lapping condition from said table by selecting a rank of a desired lapping condition of the plurality of different lapping conditions ranked, listed, and stored in the table.

10. A thin-film magnetic head manufacturing method according to claim 2, the lapping comprising rough lapping and finish lapping, the method further comprising switching the rotation rate during finish lapping.

11. A thin-film magnetic head manufacturing method according to claim 10, further comprising controlling the rotation rate of said lapping plate to be 70 to 100 rpm before switching, and 5 to 20 rpm after switching.

12. A thin-film magnetic head manufacturing method according to claim 10, further comprising:

measuring a recession from said thin-film magnetic element to a surface of said substrate opposing a recording medium after completion of lapping;

changing a lapping condition of a next lapping such that one of the recession, the MR height, and the resistance value of said magnetoresistive sensor, is appropriate;

setting the lapping condition to include the MR height in rough lapping;

ranking a plurality of different lapping conditions, listing the plurality of different lapping conditions in a table, storing the table in a memory device, and selecting the next lapping condition from said table by selecting a rank of a desired lapping condition of the plurality of different lapping conditions ranked, listed, and stored in the table.

13. A thin-film magnetic head manufacturing method according to claim 10, further comprising:

timing feeding of a lubricant during finish lapping to determine a lubrication time;

measuring a recession from said thin-film magnetic element to a surface of said substrate opposing a recording medium after completion of lapping;

changing a lapping condition of a next lapping such that one of the recession, the MR height, and the resistance value of said magnetoresistive sensor, is appropriate;

setting the lapping condition to include the lubrication time;

ranking a plurality of different lapping conditions, listing the plurality of different lapping conditions in a table, storing the table in a memory device, and selecting the next lapping condition from said table by selecting a rank of a desired lapping condition of the plurality of different lapping conditions ranked, listed, and stored in the table.

14. A thin-film magnetic head manufacturing method according to claim 10, further comprising:

measuring the time from the beginning of finish lapping to a completion of finish lapping;

changing a lapping condition of a next lapping such that the lapping time is within a predetermined range;

setting the lapping condition to include the MR height in rough lapping;

ranking a plurality of different lapping conditions, listing the plurality of different lapping conditions in a table, storing the table in a memory device, and selecting the next lapping condition from said table by selecting a rank of a desired lapping condition of the plurality of different lapping conditions ranked, listed, and stored in the table.

15. A thin-film magnetic head manufacturing method according to claim 10, further comprising:

timing feeding of a lubricant during finish lapping to determine a lubrication time;

measuring the time from the beginning of finish lapping to a completion of finish lapping;

changing a lapping condition of a next lapping such that the lapping time is within a predetermined range;

setting the lapping condition to include the lubrication time;

ranking a plurality of different lapping conditions, listing the plurality of different lapping conditions in a table, storing the table in a memory device, and selecting the next lapping condition from said table by selecting a rank of a desired lapping condition of the plurality of different lapping conditions ranked, listed, and stored in the table.

16. A thin-film magnetic head manufacturing method according to claim 10, further comprising:

measuring the time from the beginning of finish lapping to a completion of finish lapping;

changing a lapping condition of a next lapping such that the lapping time is within a predetermined range;

ranking a plurality of different lapping conditions, listing the plurality of different lapping conditions in a table, storing the table in a memory device, and selecting the next lapping condition from said table by selecting a rank of a desired lapping condition of the plurality of different lapping conditions ranked, listed, and stored in the table.

17. A thin-film magnetic head manufacturing method according to claim 2, further comprising setting the predetermined time to longer than two minutes.

18. A thin-film magnetic head manufacturing method according to claim 2, further comprising controlling the rotation rate of said lapping plate to be 70 to 100 rpm before switching, and 5 to 20 rpm after switching.

19. A thin-film magnetic head manufacturing apparatus comprising:

a holder to hold a thin-film magnetic head in which a thin-film magnetic element including a magnetoresistive sensor is formed on a substrate;

a lapping machine to lap said substrate and said thin-film magnetic element in said thin-film magnetic head held by said holder, the lapping machine having a lapping plate;

a resistance measuring mechanism to measure a resistance value of said magnetoresistive sensor during lapping;

a speed changing mechanism to change a rotation rate of the lapping plate; and a controller to monitor one of the resistance value measured by said resistance measuring mechanism and an MR height converted from the resistance value, and to control said speed changing mechanism such that the rotation rate of said lapping plate is switched to a lower rate at least once when the one of the resistance value and the MR height falls below a reference value.

20. A thin-film magnetic head manufacturing apparatus according to claim 19, wherein said lapping machine has a rough lapping stage and a finish lapping stage, and said controller measures a lapping time from a beginning of the finish lapping stage.

21. A thin-film magnetic head manufacturing apparatus according to claim 20, further comprising a memory device to store a table containing a plurality of ranked lapping conditions, wherein said controller sets, as a lapping condition of a next lapping, a lapping condition read from said table according to a finishing result of the finish lapping stage.

22. A thin-film magnetic head manufacturing apparatus according to claim 19, wherein said lapping machine has a rough lapping stage and a finish lapping stage, and is controlled by said control controller such that the rotation rate of said lapping plate is switched during the finish lapping stage.

23. A thin-film magnetic head manufacturing apparatus according to claim 22, further comprising a memory device to store a table containing a plurality of ranked lapping conditions, wherein said controller sets, as a lapping condition of a next lapping, a lapping condition read from said table according to a finishing result of the finish lapping stage.

24. A thin-film magnetic head manufacturing apparatus comprising:

a holder to hold a thin-film magnetic head in which a thin-film magnetic element including a magnetoresistive sensor is formed on a substrate;

a lapping machine to lap said substrate and said thin-film magnetic element in said thin-film magnetic head held by said holder, the lapping machine having a lapping plate;

a resistance measuring mechanism to measure a resistance value of said magnetoresistive sensor during lapping;

a speed changing mechanism to change a rotation rate of the lapping plate; and a controller to monitor one of the resistance value measured by said resistance mechanism and a MR height converted from the resistance value, to determine whether a lapping time exceeds a predetermined time, to control said lapping machine such that lapping is continued until the lapping time exceeds the predetermined time and the one of the resistance value and the MR height falls into finish tolerances, and to control said speed changing mechanism such that the rotation rate of said lapping plate is switched to a lower rate at least once when the one of the resistance value and the MR height falls below a reference value.

25. A thin-film magnetic head manufacturing apparatus according to claim 24 wherein said lapping machine has a rough lapping stage and a finish lapping stage, and is controlled by said control controller such that the rotation rate of said lapping plate is switched during the finish lapping stage.

26. A thin-film magnetic head manufacturing apparatus according to claim 25, further comprising a memory device to store a table containing a plurality of ranked lapping conditions, wherein said controller sets, as a lapping condition of a next lapping, a lapping condition read from said table according to a finishing result of the finish lapping stage.

* * * * *

UNITED STATES PATENT AND TRADEMARK OFFICE
CERTIFICATE OF CORRECTION

PATENT NO. : 6,419,552 B2
DATED : July 16, 2002
INVENTOR(S) : Masato Katoh et al.

It is certified that error appears in the above-identified patent and that said Letters Patent is hereby corrected as shown below:

<u>Title page,</u>
Item [76], Inventors, delete "1-7 Yukigaya, Outsuka-cho, Ota-ku," and substitute
-- Niigata-ken, -- in its place.
Insert Item as follows:
-- [73] Assignee: Alps Electric Co., Ltd., Tokyo (JP) --.

Signed and Sealed this

Eleventh Day of November, 2003

JAMES E. ROGAN
*Director of the United States Patent and Trademark Office*